United States Patent
Koshino

(10) Patent No.: US 7,031,735 B2
(45) Date of Patent: Apr. 18, 2006

(54) RADIO COMMUNICATION TERMINAL SYSTEM AUTOMATIC FUNCTION SETTING METHOD USED IN THE SAME

(75) Inventor: Masashi Koshino, Tokyo (JP)

(73) Assignee: NEC Corporation, Tokyo (JP)

(*) Notice: Subject to any disclaimer, the term of this patent is extended or adjusted under 35 U.S.C. 154(b) by 344 days.

(21) Appl. No.: 09/725,294

(22) Filed: Nov. 29, 2000

(65) Prior Publication Data

US 2001/0041580 A1    Nov. 15, 2001

(30) Foreign Application Priority Data

Nov. 30, 1999    (JP)    ................. 11-338920

(51) Int. Cl.
*H04B 7/00*    (2006.01)
*H04Q 7/00*    (2006.01)

(52) U.S. Cl. ............... 455/500; 455/414.1; 455/418; 455/435.1; 455/456.1; 455/552.1; 455/457

(58) Field of Classification Search ............ 455/414.1, 455/435.1, 456.1, 456.2, 456.3, 456.4, 456.6, 455/457, 552.1, 418, 419, 500
See application file for complete search history.

(56) References Cited

U.S. PATENT DOCUMENTS 6,463,278 B1 * 10/2002 Kraft et al. .................. 455/418
6,526,267 B1 *  2/2003 Jokimies et al. ......... 455/161.1

FOREIGN PATENT DOCUMENTS

| | | |
|---|---|---|
| GB | 2 323 245 A | 9/1998 |
| GB | 2 325 592 A | 11/1998 |
| JP | 07-181242 | 7/1995 |
| JP | 10-154955 | 6/1998 |
| JP | 10-190557 | 7/1998 |
| JP | 10-210143 | 8/1998 |
| JP | 10-224856 | 8/1998 |
| JP | 10-243465 | 9/1998 |
| JP | 11-018137 | 1/1999 |
| JP | 11-041651 | 2/1999 |
| JP | 11-127469 | 5/1999 |
| JP | 11-196468 | 7/1999 |
| JP | 11-243566 | 9/1999 |
| JP | 11-262047 | 9/1999 |
| WO | WO 99/11085 | 3/1999 |
| WO | WO 00/50918 | 8/2000 |

* cited by examiner

*Primary Examiner*—Edan Orgad
*Assistant Examiner*—Shaima Q. Aminzay
(74) *Attorney, Agent, or Firm*—McGinn IP Law Group, PLLC

(57) ABSTRACT

A control unit 12 executes a waiting operation by monitoring broadcast data received by a radio unit 11 and reception levels of these data at all times. When the received data being received by the radio unit 11 are found to be coincident with registered data read out from a storing unit 13, the control unit 12 causes an operating unit 14 to display a message of a content that a presence position is recognized on the display screen of a display unit 15, or it causes generation of an alarm tone from a loudspeaker 16, thus notifying the presence position recognition to the user. Afterwards, the control unit 12 sets functions of various items, such as call arrival, call arrival tone level, out-of-home dealing function ON/OFF, preset in the storing unit 13.

19 Claims, 4 Drawing Sheets

RADIO COMMUNICATION TERMINAL SYSTEM AUTOMATIC FUNCTION SETTING METHOD USED IN THE SAME

BACKGROUND OF THE INVENTION

This application claims benefit of Japanese Patent Application No. 11-338920 filed on Nov. 30, 1999, the contents of which are incorporated by the reference.

The present invention relates to radio communication terminal systems and automatic function setting methods used in the same and, more particularly, to position recognition and function setting in W-CDMA (Wideband Code Division Multiple access) and like ratio communication terminal systems.

Recently, radio communication terminal systems such as PHS (Personal Handyphone System) are in a trend of smaller size and lighter weight, and their portability is becoming readier. Usually, the presence position of a PHS user can be confirmed by making a telephone call and talking with the user.

By this method, however, it is difficult for a PHS user who is unfamiliar with geographical features to confirm his or her own presence position. To solve this problem, Japanese Patent Laid-Open No. 11-262047 proposes a technique, in which sets of base station identification data and corresponding presence position data are stored in a recording medium.

In the proposed technique, a group of base station identification data obtained by progressively receiving control channels of public base station capable of being utilized by the own or any other terminal system, is compared to a group of base station identification data stored in recording medium. By so doing, presence position data as data combination with a maximum number of identical data piece pairs can be obtained for readily confirming the presence position of the own or any other terminal system.

As for radio communication terminal system presence position determination, Japanese Patent Laid-Open No. 7-181242 shows a technique of easily determining the presence position of a mobile station in a CDMA (code division multiple access) digital mobile communication system.

However, the above prior art radio communication terminal system is receiving waveform from only a single base station during its waiting time, and therefore can specify its presence position only as wide area. In addition, the terminal system user should manually set, when necessary, functions of setting call arrival tone, arrival tone level, etc.

SUMMARY OF THE INVENTION

An object of the present invention is to solve the above problems by the provision of a radio communication terminal system and an automatic function setting method used in the same, in which the terminal system itself can make recognition as to whether its presence position is a registered one.

Another object of the present invention is to provide a radio communication terminal system and an automatic function setting method used in the same, in which the terminal system can set by itself various functions corresponding to registered presence positions.

According to the present invention, there are provided the following radio communication terminal systems:

A radio communication terminal system which executes a waiting operation by receiving broadcast data from a plurality of base stations, comprising a storing means for storing broadcast data received from a plurality of base stations when the system is in a preset presence position and reception levels of these broadcast data as registered data, and comparing means for comparing, in the waiting operation, the broadcast data received from the plurality of base stations and the reception levels of these data with registered data in the storing means.

A radio communication terminal system which executes a waiting operation by receiving broadcast data from a plurality of base stations, comprising a storing means for storing broadcast data received from a plurality of base stations when the system is in a preset presence position and reception levels of these broadcast data as registered data, comparing means for comparing, in the waiting operation, the broadcast data received from the plurality of base stations and the reception levels of these data with registered data in the storing means and setting means for setting, when the comparing means detects coincidence of compared data, its functions of contents of preset function setting items corresponding to the pertinent registered data.

A radio communication terminal system which executes a waiting operation by receiving broadcast data from a plurality of base stations, comprising a storing means for storing broadcast data received from a plurality of base stations when the system is in a preset presence position and reception levels of these broadcast data as registered data, comparing means for comparing, in the waiting operation, the broadcast data received from the plurality of base stations and the reception levels of these data with registered data in the storing means and setting means for setting, when the comparing means detects coincidence of compared data, its functions of contents of preset function setting items corresponding to the pertinent registered data, the preset function setting items at least including call arrival tone, call arrival tone level, out-of-home dealing function ON/OFF and call transfer function ON/OFF.

A radio communication terminal system which executes a waiting operation by receiving broadcast data from a plurality of base stations, comprising a storing means for storing broadcast data received from a plurality of base stations when the system is in a preset presence position and reception levels of these broadcast data as registered data, comparing means for comparing, in the waiting operation, the broadcast data received from the plurality of base stations and the reception levels of these data with registered data in the storing means and setting means for setting, when the comparing means detects coincidence of compared data, its functions of contents of preset function setting items corresponding to the pertinent registered data and restoring a preset default setting when the broadcast data received from the plurality of base stations and the reception levels of these data are changed from the compared registered data.

A radio communication terminal system which executes a waiting operation by receiving broadcast data from a plurality of base stations, comprising a storing means for storing broadcast data received from a plurality of base stations when the system is in a preset presence position and reception levels of these broadcast data as registered data, comparing means for comparing, in the waiting operation, the broadcast data received from the plurality of base stations and the reception levels of these data with registered data in the storing means and setting means for setting, when the comparing means detects coincidence of compared data, its functions of contents of preset function setting items corresponding to the pertinent registered data, the preset function setting items at least including call arrival tone, call arrival tone level, out-of-home dealing function ON/OFF and call transfer function ON/OFF and restoring a preset default setting when the broadcast data received from the plurality of base stations and the reception levels of these data are changed from the compared registered data.

The setting means sets a high speed travel mode representing arrived call reception prohibition when the broadcast data from the plurality of base stations and the reception levels of these data undergo frequent changes.

According to another aspect of the present invention, there are provided the following automatic function setting method for a radio communication terminal system:

An automatic function setting method for a radio communication terminal system, which executes a waiting operation by receiving broadcast data from a plurality of base stations, comprising a step of storing, when the system is in a preset registered presence position, broadcast data received from the plurality of base stations and reception levels of these data as registered data, and a step of comparing the broadcast data received from the plurality of base stations and the reception levels of these data with the registered data in the waiting operation.

An automatic function setting method for a radio communication terminal system, which executes a waiting operation by receiving broadcast data from a plurality of base stations, comprising a step of storing, when the system is in a preset registered presence position, broadcast data received from the plurality of base stations and reception levels of these data as registered data, a step of comparing the broadcast data received from the plurality of base stations and the reception levels of these data with the registered data in the waiting operation and a step of setting own functions of contents of preset function setting items corresponding to the pertinent registered data when coincidence of compared data is detected in the step of comparing data with the registered data.

An automatic function setting method for a radio communication terminal system, which executes a waiting operation by receiving broadcast data from a plurality of base stations, comprising a step of storing, when the system is in a preset registered presence position, broadcast data received from the plurality of base stations and reception levels of these data as registered data, a step of comparing the broadcast data received from the plurality of base stations and the reception levels of these data with the registered data in the waiting operation and a step of setting own functions of contents of preset function setting items corresponding to the pertinent registered data when coincidence of compared data is detected in the step of comparing data with the registered data, the preset function setting items at least including call arrival tone, call arrival tone level, out-of-home dealing function ON/OFF and call transfer function ON/OFF.

An automatic function setting method for a radio communication terminal system, which executes a waiting operation by receiving broadcast data from a plurality of base stations, comprising a step of storing, when the system is in a preset registered presence position, broadcast data received from the plurality of base stations and reception levels of these data as registered data, a step of comparing the broadcast data received from the plurality of base stations and the reception levels of these data with the registered data in the waiting operation and a step of setting own functions of contents of preset function setting items corresponding to the pertinent registered data when coincidence of compared data is detected in the step of comparing data with the registered data, wherein in the step of setting own functions, a preset default setting is restored when the broadcast data received from the plurality of base stations and the reception levels of these data are changed from the compared registered data.

An automatic function setting method for a radio communication terminal system, which executes a waiting operation by receiving broadcast data from a plurality of base stations, comprising a step of storing, when the system is in a preset registered presence position, broadcast data received from the plurality of base stations and reception levels of these data as registered data, a step of comparing the broadcast data received from the plurality of base stations and the reception levels of these data with the registered data in the waiting operation and a step of setting own functions of contents of preset function setting items corresponding to the pertinent registered data when coincidence of compared data is detected in the step of comparing data with the registered data, the preset function setting items at least including call arrival tone, call arrival tone level, out-of-home dealing function ON/OFF and call transfer function ON/OFF, wherein in the step of setting own functions, a preset default setting is restored when the broadcast data received from the plurality of base stations and the reception levels of these data are changed from the compared registered data.

In the step of setting own functions, a high speed travel mode representing arrived call reception prohibition made is set when the broadcast data from the plurality of base stations and the reception levels of these data undergo frequent changes.

The W-CDMA terminal system of the present invention is executing, in its waiting time, a waiting operation by receiving broadcast data from a certain number of base stations, and stores its presence position in itself by comparing the broadcast data of the certain number of base stations and broadcast data reception levels with stored contents for recognizing the terminal's presence position and setting the arrival tone and arrival tone level for each stored position.

Thus, when the W-CDMA terminal system is brought from one plane to another, it can automatically change the functions having been set to others, and the user thus need not manually set. For example, when the user is in office, the terminal system sets the arrival tone to "OFF" or "VIBRATION", thus preventing, when the user returns home, failure of being informed of a call arrival by leaving the call arrival tone "OFF".

Other objects and features will be clarified from the following description with reference to attached drawings.

PREFERRED EMBODIMENTS OF THE INVENTION

Preferred embodiments of the present invention will now be described with reference to the drawings.

Figure 1:
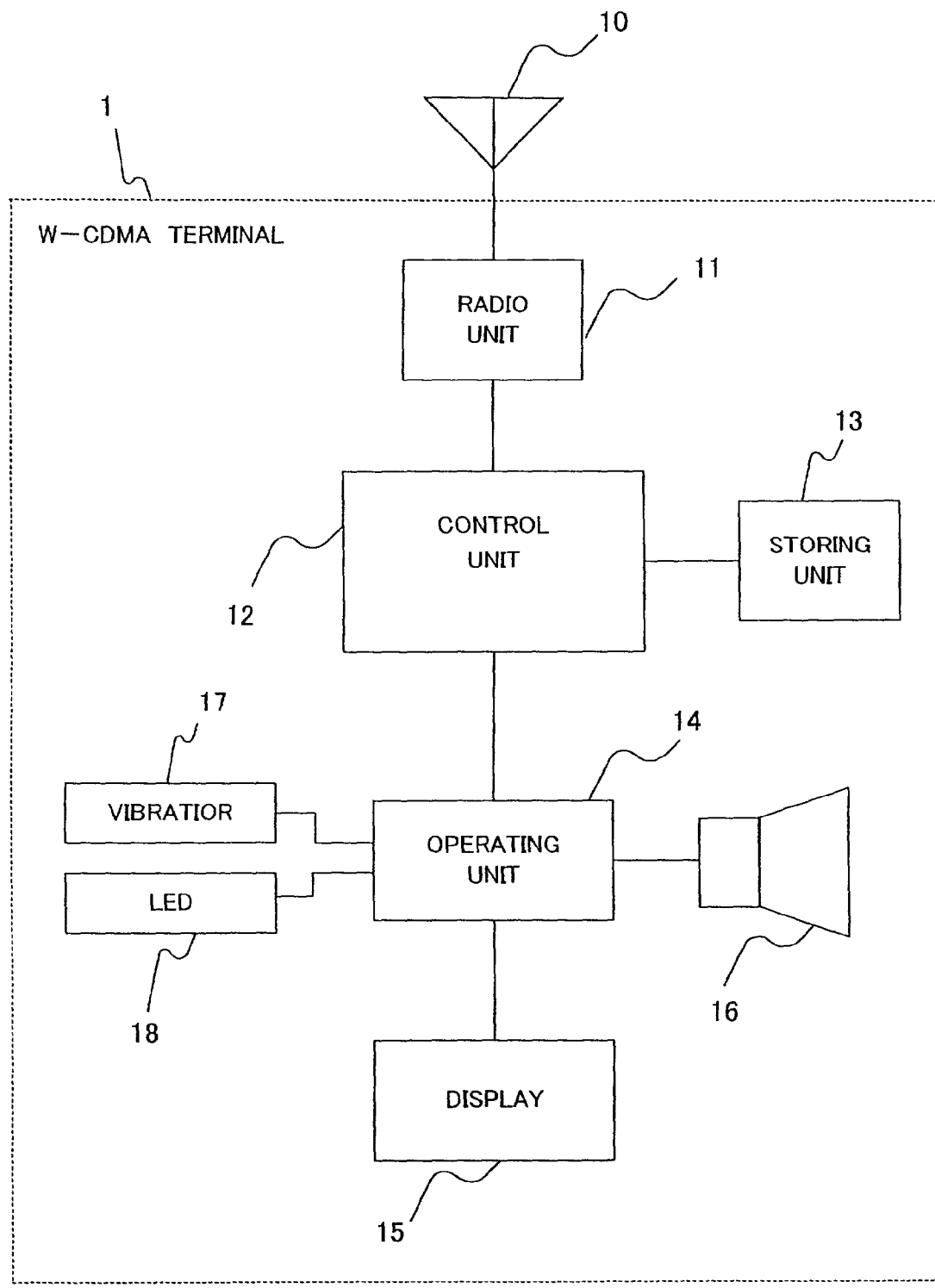
FIG. 1 is a block diagram showing a W-CDMA terminal system as one embodiment of the present invention.

An embodiment of the present invention will now be described with reference to the drawings. FIG. 1 is a block diagram showing a W-CDMA terminal system as one embodiment of the present invention. Referring to the Figure, the W-CDMA terminal 1 comprises an antenna 10, a radio unit 11, a control unit 12, a storing unit 13, an operating unit 14, a display 15, a loudspeaker 16, a vibrator 17, and an LED (Light-Emitting Diode) 18.

The radio unit 11 executes transmission and reception of signals to and from a plurality of base stations (not shown). A control unit 12 has roles of controlling the radio unit 11 and management of radio signal protocol, and stores the input data from the radio unit 11 and the operating unit 14 in the storing unit 13. The control unit 12 controls the radio unit 11 on the basis of the data stored in the storing unit 8 in response to requests from the operating unit 14.

The operation unit 14 causes display of the status of the own terminal system on the display unit 15 on the basis of the signal from the control unit 12. The loudspeaker 16, the vibrator 17 and the LED 18 are controlled by commands of the control unit 12.

Figure 2:
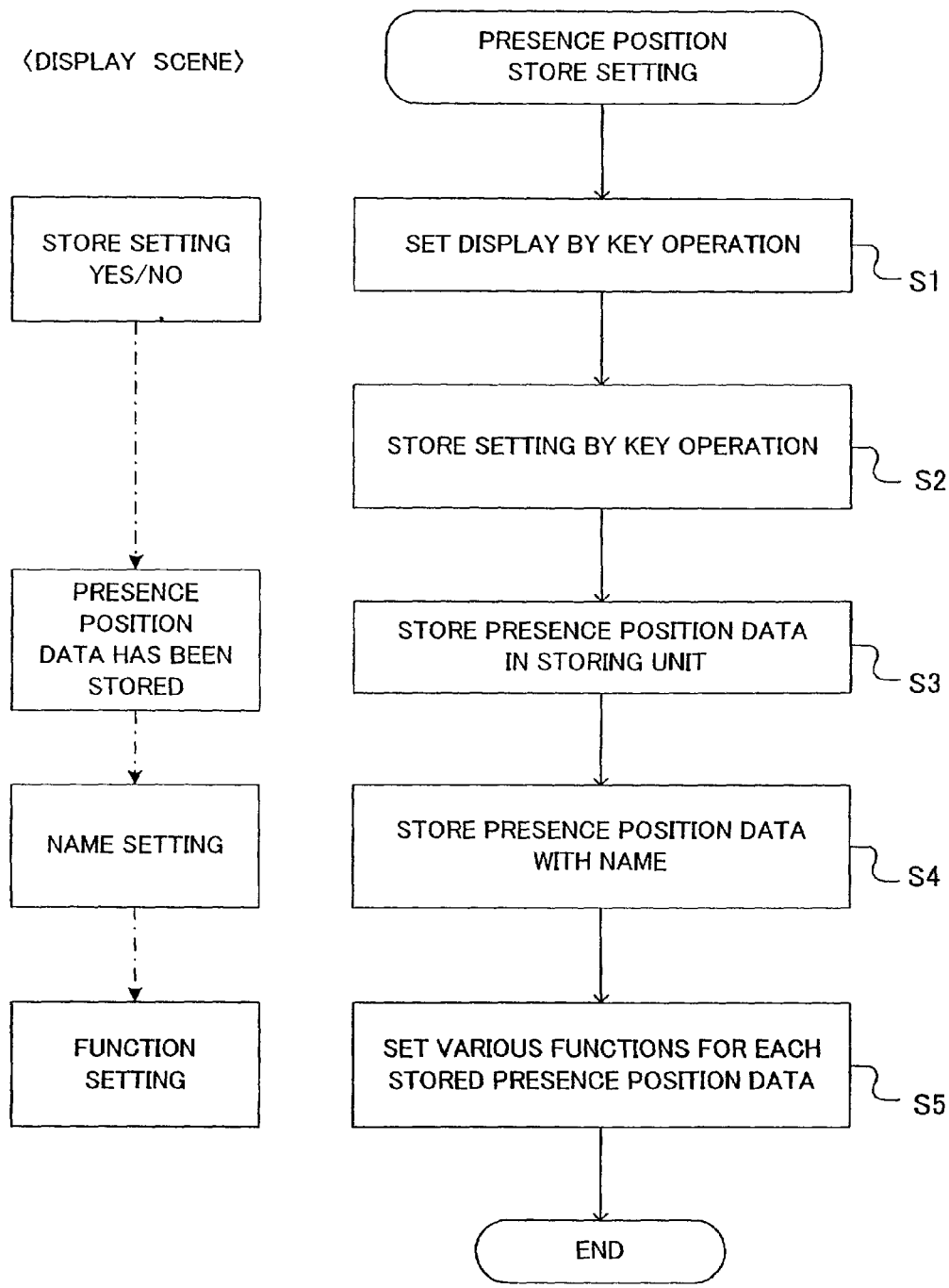
FIG. 2 is a flow chart for describing the operation of an embodiment of the present invention in presence position store setting and function setting.
Figure 3:
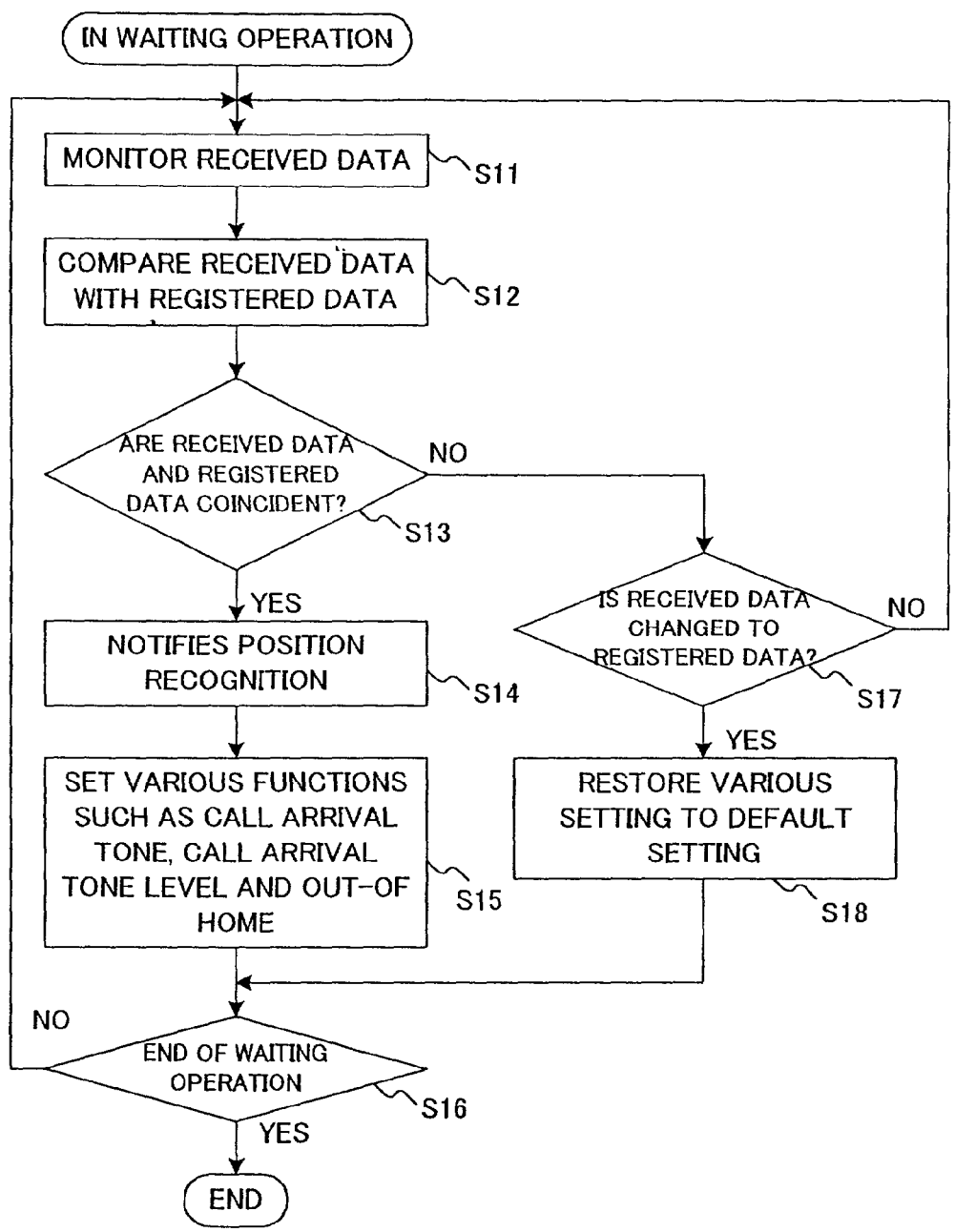
FIG. 3 is a flow chart for describing the operation of the embodiment of the present invention in waiting time.
Figure 4:
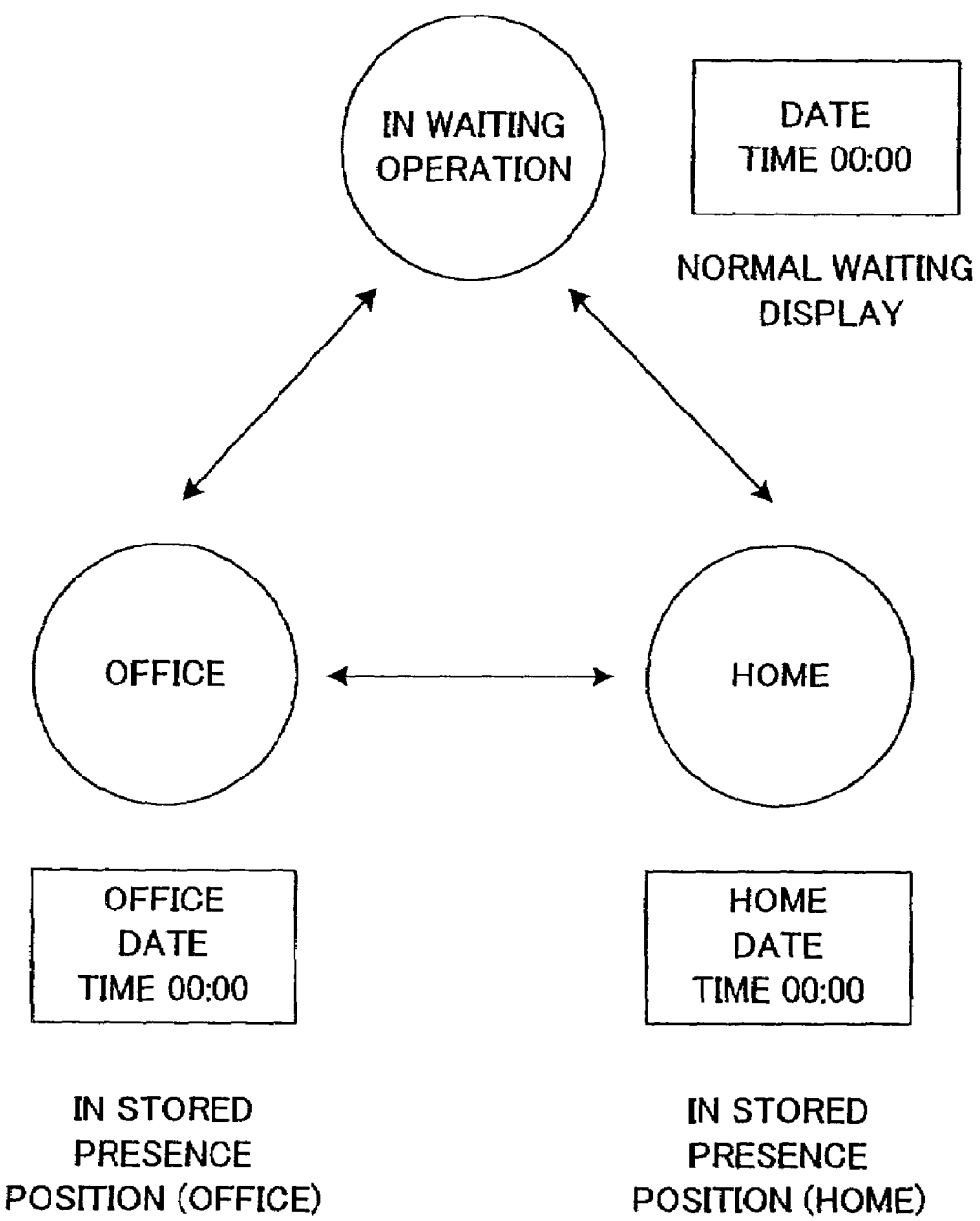
FIG. 4 is a view showing a display example in the embodiment of the present invention during movement.

FIG. 2 is a flow chart for describing the operation of an embodiment of the present invention in presence position store setting and function setting. FIG. 3 is a flow chart for describing the operation of the embodiment of the present invention in waiting time. FIG. 4 is a view showing a display example in the embodiment of the present invention during movement.

The operation of the W-CDMA terminal system 1 will now be described with reference to FIGS. 1 to 4. The routines shown in FIGS. 2 and 3 are realized through the control by the control unit 12 based on the programs stored in the storing unit 13. As memory 13 may be used, for instance, a writable/readable non-volatile memory.

In presence position store setting and function setting, according to operation in the operating unit 14 the control unit 12 causes broadcast data of base stations being received by the radio unit 11 and the reception levels of these data to be stored in the storing unit 13. As data to be stored in the storing unit 13, such names as office and own home are set. In this case, a function of setting various functions for each preset presence position is provided.

In the presence position store setting, when a "setting display call" is designated by a key operation in the operating unit 14, the control unit 12 causes the operating unit 14 to display a question "STORE SETTING: YES/NO" for the setting on the display unit 15 (step S1 in FIG. 2).

When "STORE SETTING: YES" is selected by a key operation in the operating unit 14, the control unit 12 stores the broadcast data from the base station being received by the radio unit 1 and the reception levels of these data as presence position data in the storing unit 13 (steps S2 and S3 in FIG. 2). At this time, the control unit 12 causes the operating unit 14 to display a message "PRESENCE POSITION DATA HAS BEEN STORED." on the display 15.

Subsequently, the control unit 12 causes the operating unit 14 to display "NAME SETTING" on the display 15, and causes a name (such as office, own home, etc.) preset by a key operation in the operating unit 14 to be added to the presence position data (step S4 in FIG. 2).

Thereafter, the control unit 12 causes a display of "FUNCTION SETTING" by a key operation in the operating unit 14, and causes the registered functions corresponding to individual stored presence position data to be stored in the storing unit 13 (steps S2 and S3 in FIG. 2). Among function setting items are call arrival tone, call arrival tone level, out-of-home dealing function ON/OFF and call transfer function ON/OFF.

When these function setting items are registered, the radio unit 11 in the W-CDMA terminal system notifies, in the waiting time, the number of received branches, reception levels thereof and received broadcast data to the control unit 12.

In its waiting operation, the control unit 12 monitors the broadcast data received by the radio unit 11 and the reception levels at all times (step S11 in FIG. 3). The control unit 12 compares the received data from the radio unit 11 and registered data read out from the storing unit 13 (step S12 in FIG. 13), and checks whether the received data and the registered data are coincident, that is, whether the own terminal system is in a registered presence position (step S13).

When the received data and the registered data are coincident, the control unit 11 causes the operating unit 14 to display a message of a content that the presence position is recognized on the screen of the display unit 15, or it causes an alarm sound to be produced from the loudspeaker 16, thus notifying the recognition of the presence position to the user (step S14 in FIG. 3). Subsequently, the control unit 12 executes setting of various functions, such as call arrival tone, call arrival tone level and out-of-home dealing ON/OFF (step S15 in FIG. 3).

When the received data and the registered data fail to be coincident, the received data is changed to the registered data preset in the storing unit 13 (step 17 in FIG. 3), whereupon the control unit 12 switches again the functions having been preset to those of default setting (step S18).

By the above operation the terminal system sets various functions by recognizing its own presence position. When the terminal system is not present in any registered place, "DATE" and "TIME: 00:00" are displayed. When the terminal system is brought to a registered presence position (such as office or own home", the registered presence position "OFFICE" or "OWN HOME", is displayed together with "DATE" and "TIME: 00:00" (see FIG. 4).

As shown above, the terminal system can recognize its own presence position by monitoring received data constituted by broadcast data from a plurality of base stations and reception levels of these data and comparing the received data with registered data in the storing unit 13. The terminal system thus can set by itself the functions corresponding to its presence position (i.e., registered presence position). For instance, when the user is in the office, the terminal system sets the call arrival tone to be "OFF" or "VIBRATION", and it is thus possible for the user to prevent, when he or she returns home, to prevent failure of being informed of a call arrival by leaving the call arrival tone "OFF".

Since the terminal system is adapted to recognize its own presence position, it can also recognize by itself a non-registered presence position when it is in such a place. Thus, when the terminal system is being moved by a train or a car, in which the number of base stations being received and the reception levels undergo frequent changes, it can automatically change mode to high speed travel mode and cancel call arrivals by itself. Also, at the time of release of high speed travel, the terminal system can automatically restore the normal condition.

As has been described in the foregoing, according to the present invention a radio communication terminal system, which executes a waiting operation by receiving broadcast data from a plurality of base stations, it can make recognition by itself as to whether it is in a registered presence position by storing the broadcast data from a plurality of base stations and reception levels of these data at preset registered presence positions as registered data and comparing, when it is waiting, the broadcast data of a plurality of base stations being received and the reception levels of these data with registered data.

Also, a different radio communication terminal system according to the present invention can set by itself, when it detects coincidence of the compared data, functions corresponding to the registered presence position where it is in by setting its functions with preset contents of function setting items corresponding to pertinent registered data.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A radio communication terminal, which, during a waiting operation receives broadcast data from a plurality of base stations to determine a current presence position, said terminal comprising:
   a storing unit for storing broadcast data and reception levels received from a plurality of base stations, as registered data that defines a registered presence position when said radio communication terminal is located at a preset presence position; and
   comparing means for comparing, during said waiting operation, a currently-received broadcast data and reception levels with said registered data in said storing unit, said comparing means including a determining means for determining that at least one of a number of said base stations and a reception level from said base stations is changing frequently, Thereby detecting whether said radio communication terminal is moving relative to said base stations.

2. A radio communication terminal, which, during a waiting operation receives broadcast data from a plurality of base stations to determine a current presence position, said terminal comprising:
   a storing unit for storing broadcast data and reception levels received from a plurality of base stations when said radio communication terminal is in a preset presence position as registered data, thereby defining a registered presence position;
   comparing means for comparing, during said waiting operation, a currently-received broadcast data and reception levels with said registered data in said storing unit, said comparing means including a determining means for determining that at least one of a number of said base stations and a reception level from said base stations is changing frequently, thereby detecting whether said radio communication terminal is moving relative to said base stations; and
   setting means for setting, when said comparing means detects coincidence between said currently-received broadcast data and reception levels and said registered data, a preset function corresponding to the pertinent said registered data.

3. A radio communication terminal system, which, during a waiting operation receives broadcast data from a plurality of base stations to determine a current presence position, said system comprising:
   a storing unit for storing broadcast data and reception levels received from a plurality of base stations, as registered data, when said radio communication terminal is located at a preset position to define a registered presence position;
   comparing means for comparing, during said waiting operation, currently-received broadcast data and reception levels with said registered data in said storing unit, said comparing means including a determining means for determining that at least one of a number of said base stations and a reception level from said base stations is changing frequently; and
   setting means for setting, when said comparing means detects coincidence between said currently-received broadcast data and reception levels and said registered data, a preset function corresponding to said registered data,
   wherein said preset function includes at least one of a call arrival tone, a call arrival tone level, an out-of-home dealing function ON/OFF, and a call transfer function ON/OFF.

4. A radio communication terminal, which, during a waiting operation receives broadcast data from a plurality of base stations to determine a current presence position, said terminal comprising:
   a storing unit for storing broadcast data and reception levels received from a plurality of base stations received, as registered data, when said radio communication terminal is located at a preset position to define a registered presence position;
   comparing means for comparing, during said waiting operation, a currently-received broadcast data and reception levels with said registered data in said storing unit, said comparing means including a determining means for determining that at least one of a number of said base stations and a reception level from said base stations is changing frequently; and
   setting means for setting, when said comparing means detects coincidence between said currently-received broadcast data and reception levels and said registered data, a preset function corresponding to said registered data, and for restoring a preset default setting, when said comparing means does not detect coincidence between said broadcast data and said reception levels.

5. A radio communication terminal, which during a waiting operation, receives broadcast data from a plurality of base stations to determine a current presence position, said terminal comprising:
   a storing unit for storing broadcast data and reception levels received from a plurality of base stations received, as registered data, when said radio communication terminal is located at a preset position, said registered data defining a registered presence position;
   comparing means for comparing, during said waiting operation, said broadcast data and said reception levels with said registered data in said storing unit, said comparing means including a determining means for determining that at least one of a number of said base stations and a reception level from said base stations is changing frequently; and
   setting means for setting, when said comparing means detects coincidence between said broadcast data and said reception levels, and said registered data, a preset function corresponding to said registered data, said preset function including at least one of a call arrival tone, a call arrival tone level, an out-of-home dealing function ON/OFF, and a call transfer function ON/OFF, and when said comparing means does not detect said coincidence, restoring a preset default setting.

6. The radio communication terminal according to claim 2, wherein said setting means sets a high speed travel mode that prohibits reception of an arrived call, when at least one of said number of base stations and said reception levels undergo frequent changes.

7. An automatic function setting method for a radio communication terminal, which, during a waiting operation receives broadcast data from a plurality of base stations to determine a current presence position, said method comprising:
storing, when said radio communication terminal is located at a preset position, broadcast data and reception levels received from a plurality of base stations received at said preset position, as registered data defining a registered presence position; and
comparing, during said waiting operation, said broadcast data and said reception levels with said registered data, which is stored, said comparing including a determining that at least one of a number of said base stations and a reception level from said base stations is changing frequently, thereby detecting whether said radio communication terminal is moving relative to said base stations.

8. An automatic function setting method for a radio communication terminal, which, during a waiting operation receives broadcast data from a plurality of base stations to determine a current presence position, said method comprising:
storing, when said radio communication terminal is located at a preset position, broadcast data and reception levels received from a plurality of base stations received at said preset position, as registered data defining a registered presence position;
comparing, during said waiting operation, said broadcast data and said reception levels with said registered data which is stored, said comparing including a determining that at least one of a number of said base stations and a reception level from said base stations is changing frequently, thereby detecting whether said radio communication terminal is moving relative to said base stations; and
setting a preset function corresponding to said registered data, when a coincidence between said broadcast data and said reception levels, and said registered data is detected.

9. An automatic function setting method for a radio communication terminal, which, during a waiting operation receives broadcast data from a plurality of base stations to determine a current presence position, said method comprising:
storing, when said radio communication terminal is located at a preset position, broadcast data and reception levels received from a plurality of base stations received at said preset position, as registered data to define a registered presence position;
comparing, during said waiting operation, said broadcast data and said reception levels with said registered data, which is stored, said comparing including a determining that at least one of a number of said base stations and a reception level from said base stations is changing frequently; and
setting a preset function corresponding to said registered data, when a coincidence between said broadcast data and said reception levels, and said registered data is detected, said preset function including at least one of a call arrival tone, a call arrival tone level, an out-of-home dealing function ON/OFF, and a call transfer function ON/OFF.

10. An automatic function setting method for a radio communication terminal, which during a waiting operation receives broadcast data from a plurality of base stations to determine a current presence position, said method comprising:
storing, when said radio communication terminal is located at a preset position, broadcast data and reception levels received from a plurality of base stations being received at said preset position, as registered data defining a registered presence position;
comparing, during said waiting operation, said broadcast data and said reception levels with said registered data, which is stored, said comparing including a determining that at least one of a number of said base stations and a reception level from said base stations is changing frequently; and
setting a preset function corresponding to said registered data, when a coincidence between said broadcast data and said reception levels, and said registered data is detected,
wherein said setting includes restoring a preset default setting, when said broadcast data and said reception levels are not coincident with said registered data.

11. An automatic function setting method for a radio communication terminal, which, during a waiting operation receives broadcast data from a plurality of base stations to determine a current presence position, said method comprising:
storing, when said radio communication terminal is located at a preset position, broadcast data and reception levels received from a plurality of base stations received at said preset position, as registered data to define a registered presence position;
comparing, during said waiting operation, said broadcast data and said reception levels with said registered data which is stored, said comparing including a determining that at least one of a number of said base stations and a reception level from said base stations is changing frequently; and
setting a preset function corresponding to said registered data, when a coincidence between said broadcast data and said reception levels, and said registered data is detected, said preset function including at least one of a call arrival tone, a call arrival tone level, an out-of-home dealing function ON/OFF, and a call transfer function ON/OFF,
wherein said setting includes restoring a preset default setting, when said broadcast data and said reception levels are not coincident with said registered data.

12. The automatic function setting method according to claim 8, wherein said setting sets a high speed travel mode that prohibits reception of an arrived call, when at least one of said number of base stations and said reception levels undergoes frequent changes.

13. The radio communication terminal system according to claim 3, wherein said setting means sets a high speed travel mode prohibits reception of an arrived call, when at least one of said number of base stations and said reception levels undergoes frequent changes.

14. The radio communication terminal system according to claim 4, wherein said setting means sets a high speed travel mode prohibits reception of an arrived call, when at least one of said number of base stations and said reception levels undergoes frequent changes.

15. The radio communication terminal system according to claim 5, wherein said setting means sets a high speed travel mode prohibits reception of an arrived call, when at least one of said number of base stations and said reception levels undergoes frequent changes.

16. The automatic function setting method according to claim 9, wherein said setting sets a high speed travel mode that prohibits reception of an arrived call, when at least one of said number of base stations and said reception levels undergoes frequent changes.

17. The automatic function setting method according to claim 10, wherein said setting sets a high speed travel mode that prohibits reception of an arrived call, when at least one of said number of base stations and said reception levels undergoes frequent changes.

18. The automatic function setting method according to claim 11, wherein said setting sets a high speed travel mode that prohibits reception of an arrived call, when at least one of said number of base stations and said reception levels undergoes frequent changes.

19. A radio communication system, comprising:
a plurality of base stations; and
a radio communication terminal according to claim 1.

* * * * *